Jan. 2, 1951 H. C. LAWIN 2,536,190

RECORD CHANGER SPINDLE

Filed June 21, 1947 2 Sheets-Sheet 1

Inventor
Harold C. Lawin

By: Spencer, Marzall, Johnston & Cook
Att'ys

RECORD CHANGER SPINDLE

Filed June 21, 1947 2 Sheets-Sheet 2

Inventor
Harold C. Lawin
By: Spencer, Marzall, Johnston & Cook
Attys

Patented Jan. 2, 1951

2,536,190

UNITED STATES PATENT OFFICE 2,536,190

RECORD CHANGER SPINDLE

Harold C. Lawin, Crystal Lake, Ill., assignor to The Erwood Co., Chicago, Ill., a corporation of Illinois Application June 21, 1947, Serial No. 756,152

1 Claim. (Cl. 274—10)

The present invention relates in general to supports and has more particular reference to an improved pin construction particularly adapted for supporting phonographic disc records in stacked relationship for delivery in record playing position on a record turntable, such disc supporting members being commonly referred to as center pins.

Phonographic record disc feeding apparatus may comprise means for delivering record members or discs successively from a stack or magazine into playing position upon a motor driven disc turntable, including mechanism for accomplishing related control operations such as the application and withdrawal of a sound pick-up device to and from a disc in playing position on the turntable, and disc feeding apparatus whereby to successively deliver record discs from the stack or magazine to the turntable. In such apparatus the record disc stack may be supported in elevated position above the turntable as by means of a center pin extending through the center opening of the discs, comprising the stack, and having upwardly facing shoulder means for engaging and supporting the stack at the edge of the center opening of the lowermost disc of the stack.

Additional support means forming a ledge or shoulder may be provided in position to support the stack by engagement beneath the edge of the lowermost disc in the stack. Such edge supporting means may be provided with pusher means operable to engage and push the lowermost disc of the stack in a radial direction to disengage the edge thereof from the edge supporting shoulder and the center portions thereof from the support shoulder of the center pin. The lowermost disc in the stack may thus be released from the support shoulders for delivery downwardly along the pin onto the turntable.

An important object of the present invention is to provide an important and simplified center support means for supporting a stack of phonographic record discs above a record turntable; a further object being to provide a center support having upwardly facing means forming a depressible shoulder normally urged into position to engage and support the lowermost disc of a stack of discs on the pin, the shoulder being depressible to facilitate removal of record discs from playing position on the turntable by movement thereof along the support in a direction upwardly of the turntable.

Another important object is to provide a center support, for phonographic record discs, in the form of a pin having a downwardly facing shoulder on one side and a depressible shoulder element, on said pin, and normally providing an upwardly facing disc supporting shoulder, on the other side of the pin and offset below the downwardly facing shoulder a distance substantially equal to the thickness of a record disc, said depressible element facilitating the upward removal of record discs, on said center support, past said downwardly facing shoulder.

Another important object resides in providing suitable edge supporting and pushing means for use in combination with a center support having a depressible shoulder member, said edge supporting means being disposed on the side of the center pin remote from said depressible shoulder member and comprising edge supporting lip means yieldable in an upward direction to facilitate unobstructed movement of record discs upwardly along the center pin past said depressible shoulder member and said upwardly yieldable lips, to allow ready removal of records from playing position in the turntable.

The foregoing and numerous other important objects, advantages, and inherent functions of the invention will become apparent as the same is more fully understood from the following dedescription, which, taken in connection with the accompanying drawings, discloses a preferred embodiment of the invention.

Referring to the drawings.

Figure 1:
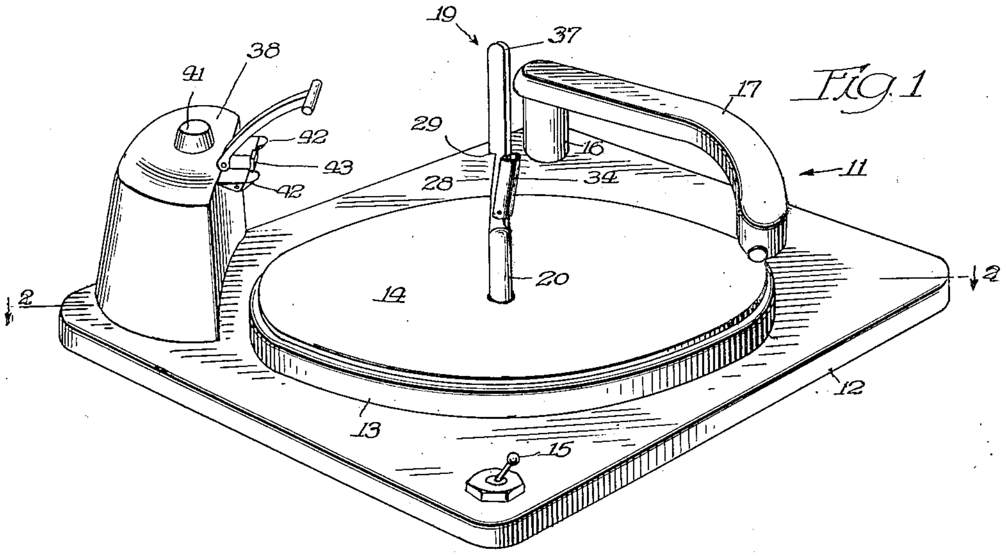
Fig. 1 is a perspective view of a phonographic record disc player embodying center support in construction made in accordance with the present invention.
Figure 3:
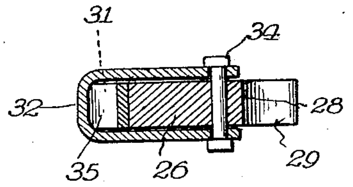
Fig. 3 is an enlarged sectional view taken substantially along the line 3—3 in Fig. 2.
Figure 4:
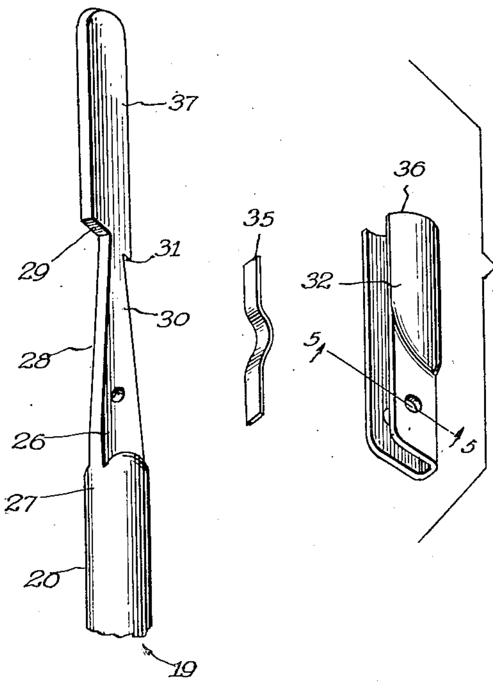
Fig. 4 is a perspective view of parts comprising the center pin structure.
Figure 5:
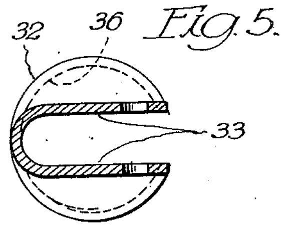
Fig. 5 is an enlarged sectional view taken substantially along the line 5—5 in Fig 4.
Figure 2:
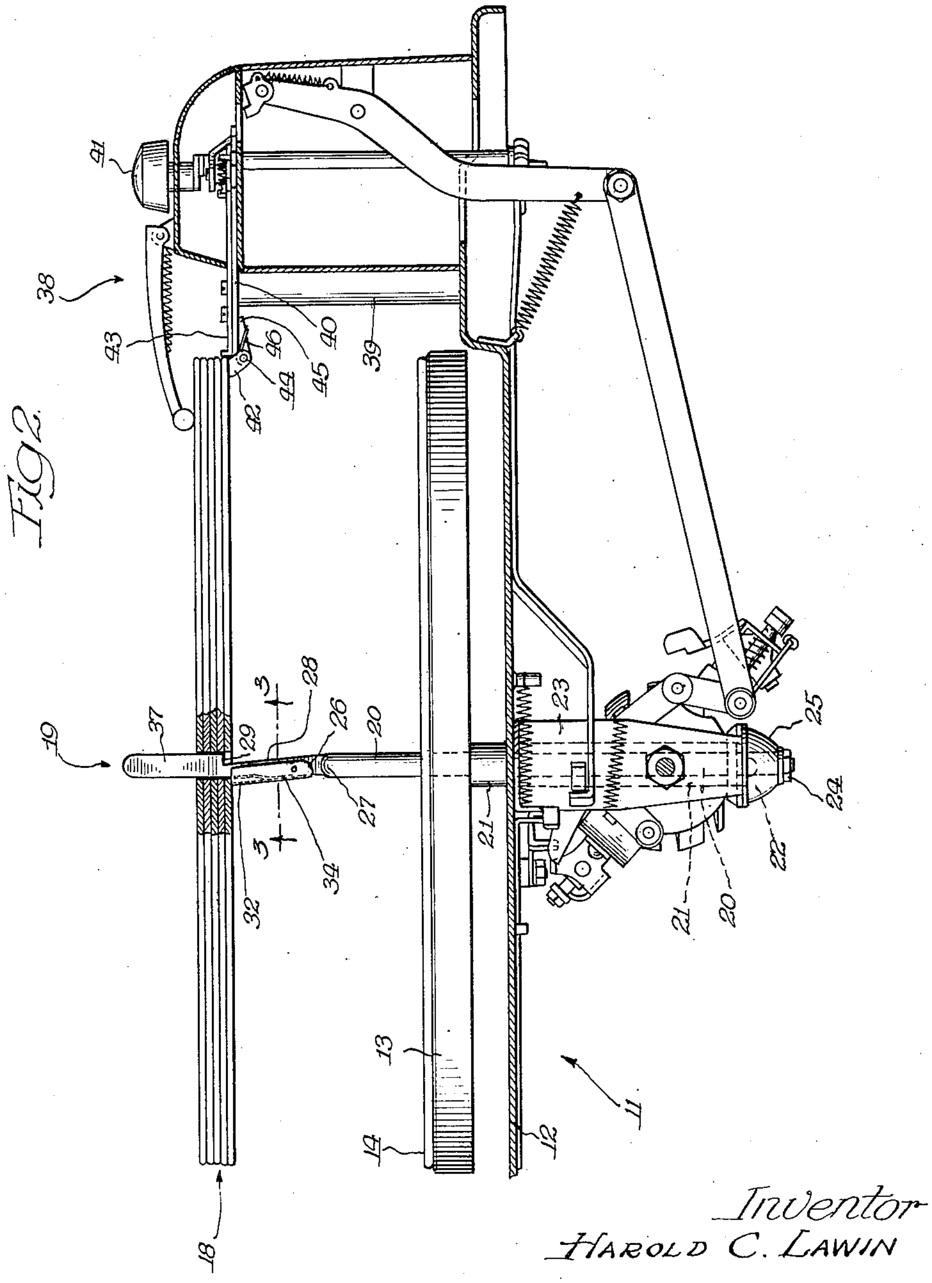
Fig. 2 is a sectional view taken substantially along the line 2—2 in Fig. 1.

To illustrate the invention the drawings show a record player 11, comprising a support plate 12 carrying a record turntable 13 turnably mounted on the plate in position to support a record 14 in playing position thereon. The turntable is mounted for rotation on the support plate 12 in any suitable or preferred bearing means.

The turntable may be driven by an electric motor in any suitable fashion, the motor being preferably secured on the under side of the plate. The motor may have a shaft extending through the plate and carrying a turntable driving wheel in position to drivingly engage a down-turned marginal rim on the turntable. Operation of the motor may be controlled by a suitable switch 15 preferably mounted on the plate 12, the switch having its manually operable member exposed above the plate and being electrically connected in a suitable motor energizing circuit.

The plate 12, outwardly of the turntable, may be provided with a pedestal 16 on which a pick-up device comprising an arm 17 may be pivotally mounted for swinging movement about the vertical axis of the pedestal. The arm is also preferably mounted for movement about a horizontal axis at the top of the pedestal so that the pick-up device at the swinging end of the arm may engage and may be raised from engagement with a record disc in playing position on the turntable. The pick-up device on the arm 17 may, of course, be connected with any suitable sound reproducing apparatus, so that by applying the pick-up device to a record on the turntable and by operating the driving motor the apparatus may reproduce the sounds recorded on the record disc.

Suitable mechanism may be provided for the delivery of records in playing position on the turntable. Such mechanism, as shown, may comprise magazine means for supporting a stack of records 18 in position to be delivered successively into playing position on the turntable, the delivery mechanism including suitable means operable for ejecting records successively from the stack and delivering them onto the turntable.

To this end a center pin 19, commonly referred to as a turntable spindle, may be provided for supporting the record stack 18 at the center portions thereof. This pin has a preferably cylindrical base portion 20 extending centrally through the turntable 13 and secured either directly or indirectly on the support plate 12 in any suitable fashion, the turntable being rotatable about the central axis of the pin. As shown, the turntable is provided with a downwardly extending central sleeve 21 which extends through the turntable bearing in the plate 12, the lower end of the sleeve 21 being turnably mounted at its lower end in a bearing 22. This bearing 22, in turn, is supported on a mounting bracket 23, of generally U-shaped configuration, carried on and extending beneath the plate 12. The lower end portions 20 of the center pin may extend within the sleeve 21, which is freely turnable about said pin portions. The lower extremity of the center pin may be secured as by means of a fastening nut 24 to a mounting member 25 on the bracket 23 at and in line with the lower end of the sleeve member 21, said mounting member 25 forming a casing for the bearing 22. The center pin 19 is thus held against turning movement while the turntable is rotated about the axis thereof by operation of the driving motor.

The center pin extends upwardly of the turntable and has upper portions 26 preferably formed to rectangular sectional configuration above a shoulder 27 on the pin. This portion of rectangular configuration may be cut away as at 28 to form a downwardly facing shoulder 29 on one side of the pin. The pin portion 26, on the side thereof opposite from the cut away portion 28, may also be cut out to form a recess 30 terminating in a downwardly facing shoulder 31 in position slightly offset below the downwardly facing shoulder 29. The center pin also carries a channel shaped lever 32 having side portions 33 embracing the pin portion 26, above the shoulder 27, and pivotally secured to said portions as by means of a pivot pin or rivet 34.

A leaf spring 35 may be enclosed within and carried by the member 32 in position to bear upon the pin portion 26 in the recess 30, to normally urge the member 32, on its pivot 34, in a direction to project the upper end of the member 32 outwardly of the shoulder 31, whereby to form an upwardly facing ledge or shoulder 36 projecting outwardly of the pin portions 26 on the side thereof opposite from the shoulder 29, the shoulders 36 and 29 being relatively offset a distance very slightly greater than the thickness of a record disc.

The member 32 is depressible on the center pin against the urge of the spring 35 to bring the shoulder 36 into facing alignment with the shoulder 31. When in such position, the member 32 extends within the cut out portion or recess 30 and provides, in effect, a continuation of the cylindrical portions of the center pin, said member 32 at its upper or shoulder forming end, being preferably bent to circular configuration on a radius of curvature substantially equal to the radius of the lower pin portions 20.

The foregoing arrangement of the center pin allows it to function as a means for supporting the record disc stack 18 above the turntable 13, the discs of the stack being carried in concentric alignment with the upper end of the center pin extending through the aligned center openings of the records. The portions of the pin above the downwardly facing shoulder 29 have a major sectional dimension only slightly less than the diameter of the central openings of the discs whereby the discs in the stack are supported in concentric alignment on said upper pin portions 37.

The record discs, of course, may be applied to the center pin by inserting their aligned center openings over the upper, preferably rounded, end of the pin; and the records will be supported by the upwardly facing shoulder 36 extending in projected position underlying the lowermost record of the stack on one side of the central opening thereof.

It will be noted that all of the records in the stack, with the exception of the lowermost record, are positively held in concentric alignment by the upper portions 37 of the center pin. Since the downwardly facing shoulder 29 of the center pin is spaced above the upwardly facing shoulder 36 a distance slightly greater than the thickness of a record, the lowermost record in the stack may be moved on the center pin in a radial direction to align its central opening with the upper end of the hollow lever 32. When so moved, the lowermost record disc will be free to fall, under the influence of gravity, in a downward path, guided by the lower portions of the center pin, and thus be deposited as a record disc 14 in position to be played on the turntable.

In order to thus move the lowermost record disc in the stack to release or eject it from the stack and deposit it in playing position on the turntable, edge pushing mechanism 38 of any suitable or preferred character may be provided. As shown, this pushing mechanism may comprise a suitable pedestal 39 on the support plate 12 outwardly of the edge of the turntable. This pedestal is preferably disposed on the side of the center pin remote from the depressible shoulder forming member 32.

The pedestal 39 may provide a slideway for a plate member 40 mounted for adjustable sliding movement in a direction radially of the record stack 18, means controlled by a manually operable knob 41 being provided for thus adjustably moving the plate 40. The plate 40 at its stack facing edge may be provided with a pair of lugs or ears 42 in position to underlie the edge of the lowermost record in the stack 18 and thereby support the stack substantially horizontally on the shoulder 36 of the center pin and on the lugs 42, the plate 40 being cut back intermediate the lugs. By adjusting the plate 40 on the pedestal 39 the supporting lugs may be positioned for the edge support of a stack of record discs of small size such as standard ten-inch phonographic record discs. By retracting the plate 40 to another adjusted position, the lugs 42 may be positioned for the edge support of a stack of larger discs such as standard twelve-inch record discs.

The plate 40 also may provide for the sliding support of an edge pushing plate 43. The plate 43 may be normally urged toward a retracted position on the plate 40 as by means of a spring, and means may be provided for projecting the plate 43 against said spring into engagement wth the edge of the lowermost disc on the stack 18, at the side thereof diametrally opposite the center pin shoulder 36. Such edge pushing action may be continued sufficiently to align the center opening of such lowermost disc of the stack with the shoulder member 32 of the center pin, and to disengage the edge of the disc from the lugs 42, whereupon the disc will be free to drop downwardly on the center pin into playing position on the turntable. Any suitable or preferred mechanism as, for example, the mechanism illustrated and described in the co-pending application Serial No. 756,273, filed by Joseph Erwood, of even date herewith, may, of course, be employed for actuating the edge pushing plate 43.

As shown, the lugs 42 may comprise sheet metal members pivotally supported on the plate 40 as by means of pivot pins 44; and the members 42 may be provided with extensions 45 adapted to engage the under side of the plate 40 in order to support the lugs in stack supporting position on the plate 40. Spring means 46 also may be provided normally to urge the lugs 42 on the plate toward stack supporting position. This arrangement, however, will allow the lugs 42 to rotate in an upward direction on their support pins 44. This arrangement, in conjunction with the depressible center pin member 32, greatly facilitates the removal of a record disc or discs from the turntable by merely lifting the same upwardly on the center pin. As records are thus moved upwardly from playing position on the turntable, the member 32 will be depressed on the center pin, thereby allowing the discs, being removed, to clear the shoulder 29; and the lugs 42, likewise, will rotate upwardly to allow the edges of the records to freely pass the edge supporting device.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

A disc record centering and supporting spindle adapted to pass through a center hole of a disc record, said spindle comprising a recessed portion, and an open sided generally tubular member partially surrounding said recessed portion and having a diameter substantially equal to the diameter of the unrecessed portion of said spindle, said tubular member being pivoted to said recessed portion, said pivot being at a point intermediate the length of said tubular member and generally transverse to the planes of the open spaced sides of said tubular member.

HAROLD C. LAWIN.

REFERENCES CITED

The following references are of record in the file of this patent:

UNITED STATES PATENTS

| Number | Name | Date |
|---|---|---|
| 2,063,199 | Slater | Dec. 8, 1936 |

FOREIGN PATENTS

| Number | Country | Date |
|---|---|---|
| 241,703 | Switzerland | Aug. 16, 1946 |